(12) United States Patent
Goodchild

(10) Patent No.: US 6,237,352 B1
(45) Date of Patent: May 29, 2001

(54) WATER PRODUCING AND DISPENSING MACHINE

(76) Inventor: Winton J. Goodchild, 67 Wolcott Dr., N. Ft. Myers, FL (US) 33903

( * ) Notice: Subject to any disclaimer, the term of this patent is extended or adjusted under 35 U.S.C. 154(b) by 0 days.

(21) Appl. No.: 09/376,697

(22) Filed: Aug. 18, 1999

(51) Int. Cl.[7] .................................................. F25B 41/00
(52) U.S. Cl. .............................. 62/196.4; 62/93; 62/278; 62/272
(58) Field of Search ................................... 62/92, 93, 150, 62/196.1, 196.4, 197, 201, 272, 277, 285, 288, 278

(56) References Cited

U.S. PATENT DOCUMENTS

| | | |
|---|---|---|
| 2,944,404 | 7/1960 | Fritts . |
| 3,024,616 | 3/1962 | Bury . |
| 3,050,948 | 8/1962 | Jones . |
| 3,126,710 | 3/1964 | Boehner et al. . |
| 3,555,843 * | 1/1971 | Cook ..................................... 62/196.4 |
| 4,146,372 | 3/1979 | Groth et al. . |
| 4,182,132 | 1/1980 | Nasser et al. . |
| 4,240,266 * | 12/1980 | Scrine et al. ......................... 62/196.4 |
| 4,252,003 | 2/1981 | Eckard et al. . |
| 4,351,651 | 9/1982 | Courneya . |
| 4,400,948 | 8/1983 | Moorehead . |
| 4,428,207 | 1/1984 | Hall . |
| 4,505,128 | 3/1985 | Miller et al. . |
| 4,828,171 | 5/1989 | Akin, Jr. et al. ........................ 237/19 |
| 4,949,552 | 8/1990 | Adams ................................. 62/196.4 |
| 5,076,068 * | 12/1991 | Mikhail ........................... 62/196.4 X |
| 5,106,512 | 4/1992 | Reidy . |
| 5,149,446 | 9/1992 | Reidy . |
| 5,183,101 * | 2/1993 | Penaluna et al. ................. 62/196.4 X |
| 5,203,989 * | 4/1993 | Reidy ..................................... 62/93 X |
| 5,212,958 | 5/1993 | Anderson . |
| 5,375,421 | 12/1994 | Hsieh . |
| 5,517,829 * | 5/1996 | Michael ................................. 62/272 |
| 5,555,732 | 9/1996 | Whiticar . |
| 5,701,749 | 12/1997 | Zakryk . |
| 5,845,504 | 12/1998 | Lebleu ..................................... 62/92 |
| 6,058,718 * | 5/2000 | Forsberg et al. ...................... 62/92 X |

* cited by examiner

Primary Examiner—Harry B. Tanner
(74) Attorney, Agent, or Firm—Laura G. Barrow

(57) ABSTRACT

A machine capable of generating and dispensing potable water is disclosed. Novel features of the inventive machine include continuous water filtration, a durable primary outer housing unit designed to minimize damage during transportation and handling, and a hot gas injection system designed to allow the generation of water from ambient air at temperatures as low as 50° F.

8 Claims, 5 Drawing Sheets

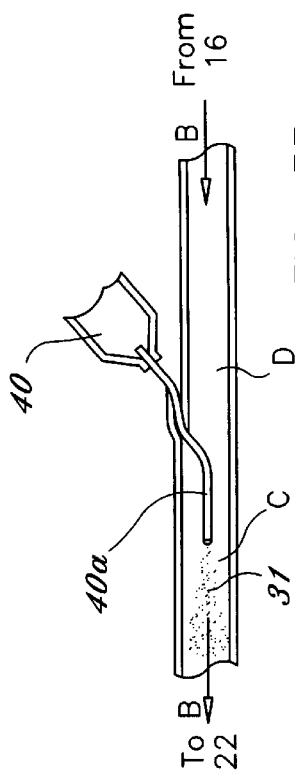
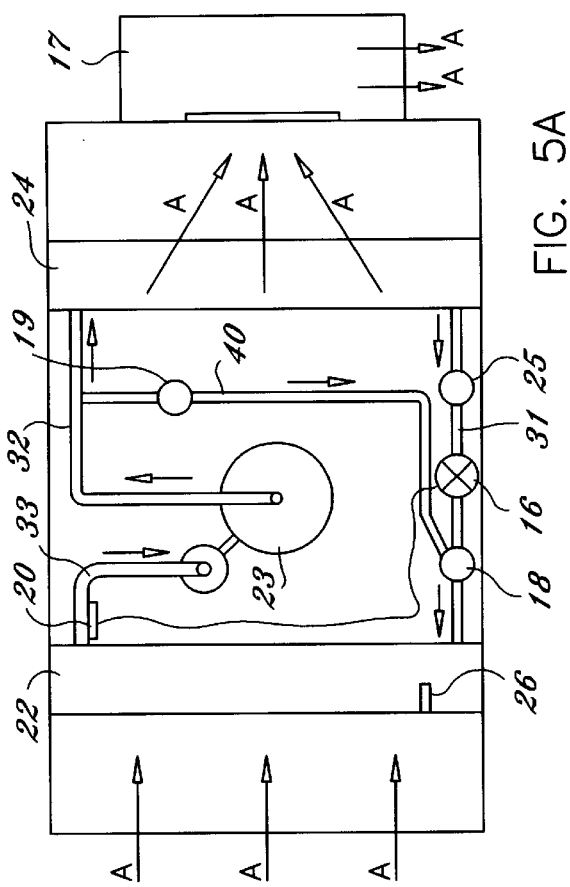
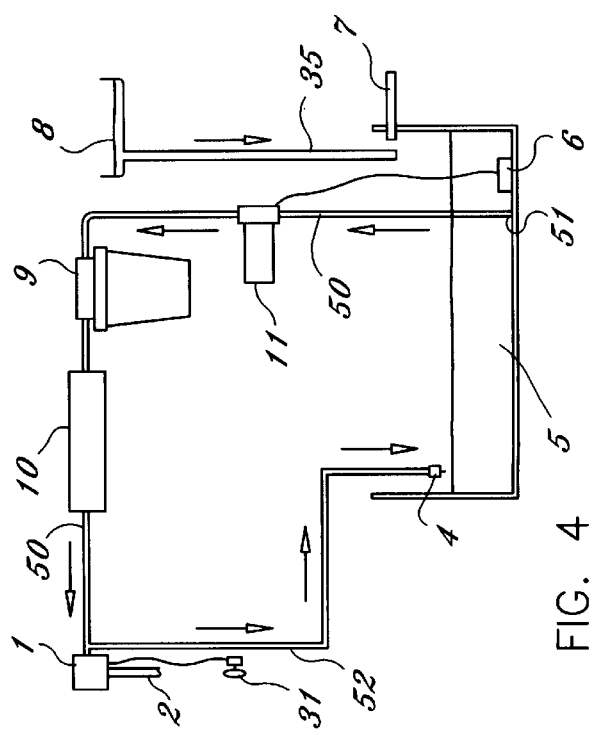

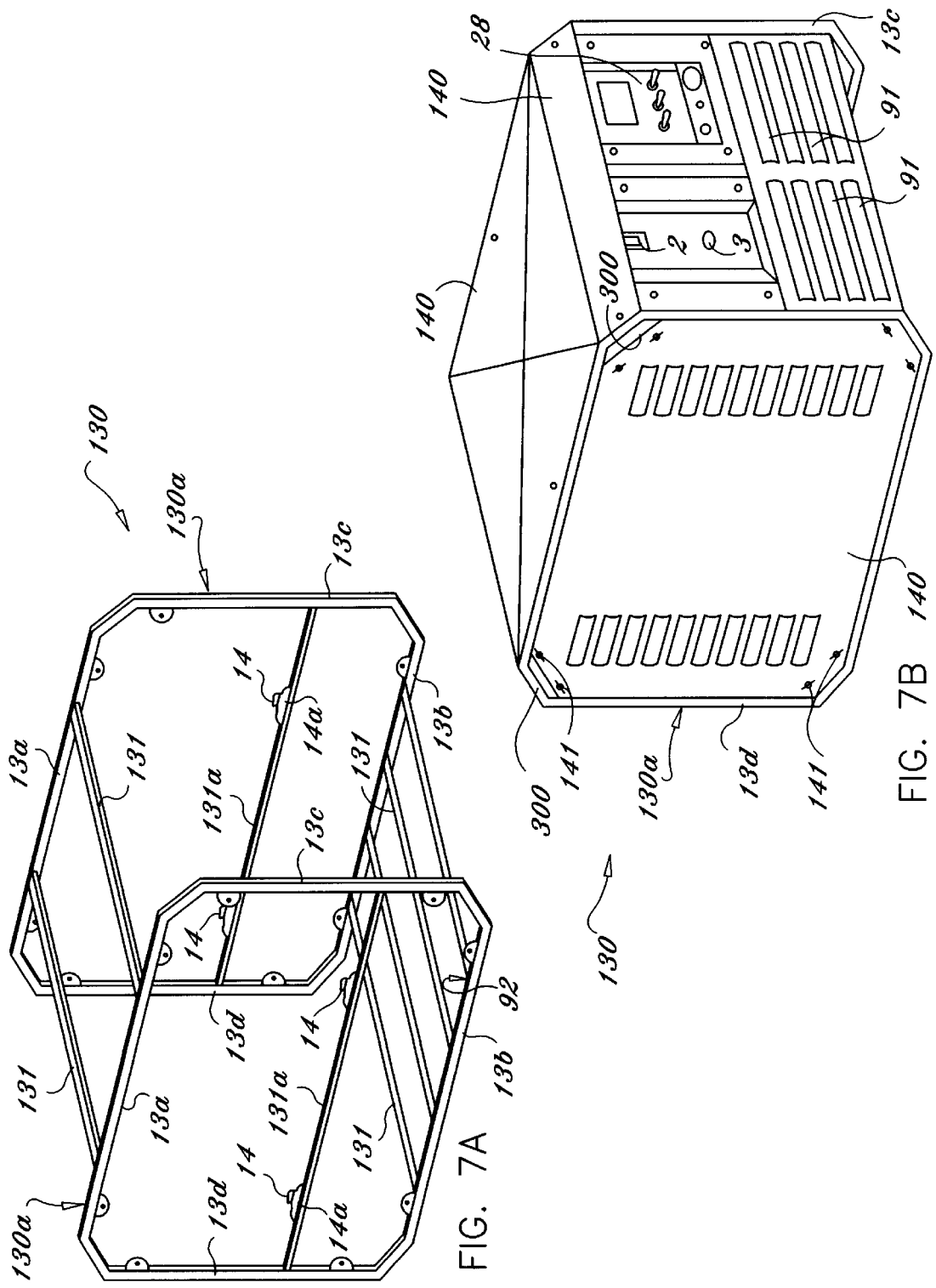

WATER PRODUCING AND DISPENSING MACHINE

BACKGROUND AND SUMMARY OF THE INVENTION

There are a number of water generating machines described in the art which employ conventional dehumidifiers for removing water from the air for collection into a storage tank. Many machines also employ various types of water and air filtration systems to create water that is safe to drink. While current water producing machines may operate satisfactorily indoors at room temperature conditions, they are not particularly conducive for use outdoors, especially at lower temperatures. In situations where it is desirable to operate the water producing machine outdoors, many if not all of these machines will be inoperable at cooler temperatures.

In military applications, for example, it is particularly desirable to have a potable water producing machine readily on-hand. Each soldier requires a minimum of about a gallon of water per day under battle conditions. Water is not only necessary for drinking purposes, but many food rations are dehydrated, requiring the addition of water prior to consumption. Moreover, in certain areas, water may be scarce or not safe for consumption, thus requiring the transport of fresh water in the field. However, carrying fresh water at about 8.3 pounds/gallon can be difficult to carry and transport. Having the ability to produce water on-site or on a moving vehicle could overcome the logistical problem of distribution.

Generally, during military training expeditions or in actual military actions, military personnel are required to camp outdoors. Under such conditions, it is especially beneficial to have a water producing machine that will operate at outdoor temperatures as low as 50° F., as may be readily encountered in certain regions. Moreover, it is especially important in military applications to have all supplies and equipment, including the water producing machine, to be readily and quickly transportable under rigorous conditions, including air drop deliveries. It is also desirable that the water generating machine be capable of operating from the electrical system of a military vehicle.

The present invention is a potable water producing and dispensing machine that incorporates one or more improvements over the prior art that make the machine particularly conducive for use outdoors, especially in outdoor military applications. While the most preferred embodiment of the present invention employs all of the novel features described and illustrated herein, it will be appreciated by the skilled artisan that the present invention is broader than the most preferred embodiment, and thus may incorporate only one or more of the improved features, as described and claimed herein.

In general, the present invention comprises (a) a housing unit having an air outlet and an air inlet; and (b) a dehumidifier system disposed within the housing unit between the air inlet and outlet. The dehumidifier system comprises an air blower that draws ambient air into the housing unit via the air inlet and through the dehumidifier system. The dehumidifier system may be any conventional dehumidifier system that is capable of removing water from ambient air. A conventional dehumidifier system comprises an evaporator, a compressor pumping a refrigerant gas, a condenser, and an air blower. In the preferred embodiment of the present invention, the dehumidifier system is designed to remove water from ambient air drawn into the housing unit through the air inlet as ambient air moves over the evaporator surface and condenses thereon as water droplets. The inventive machine further includes a water containment tank in communication with the evaporator and disposed within the housing unit. The tank is structured to receive and store the water droplets from the evaporator.

Additional aspects of the inventive machine include a novel water dispensing and filtration system disposed within the housing unit and which is in communication with the water containment tank. The water dispensing and filtration system further comprises (a) a water delivery tube having one end positioned within the water containment tank to remove water from the tank and a second end in communication with a spigot; (b) a water pump connected to the water delivery tube; (c) at least one water filter in communication with the water delivery tube; and (d) a water return tube having one end positioned within the water containment tank and a second end in communication with the water delivery tube; whereby when the water pump is activated and the spigot is closed, water is drawn from the water containment tank, carried through the water delivery tube and water filter, and then through the return tube and back into the water containment tank. The water dispensing and filtration system further includes a dispensing switch for opening and closing the spigot via a valve connected to the spigot. When the dispensing switch is activated to open the valve, water contained and moving through the water delivery tube is diverted from the water return tube and dispensed through the spigot. When the dispensing switch is activated to close the valve, the water continues to flow from the water delivery tube through the return tube and to the water containment tank. Preferably, the return tube has a narrow diameter near the end positioned within the water containment tank, thereby further causing the water to be diverted from the return tube to and though the spigot upon activation of the dispensing switch to open the valve. These aspects of the invention allow for continuous water filtration prior to dispensing, thereby minimizing, if not eliminating entirely, the risk of water stagnation within the water containment tank during long periods of non-use.

Other aspects of the present invention include a novel construction of the housing unit that protects the interior contents of the machine from damage during very rigorous handling and transportation. Preferably, the housing unit incorporates an exoskeletal frame formed of a strong metal that provides an extremely durable enclosure. The side panels, top and bottom panels, and end panels may be formed of a durable material, such as steel or aluminum, to encase the interior contents. The provision of a such a rugged enclosure is particularly desirable in military applications, where it may be necessary at times to air drop the machines from airplanes or helicopters to desired locations or to load over truck sides. Without some means of protecting the machines from damage during these deliveries, the machines would be severely damaged upon falling. The outer frame of the present invention solves this problem, and allows air drop deliveries of the machines by parachute.

The present invention, in certain embodiments, may also include a novel hot gas injection system that functions to prevent condensate from freezing on the evaporator surface, and thereby continue operation, at temperatures of about 20° F. below ambient. This feature is particularly desirable for use at low outdoor temperatures, where freezing of the evaporator presents a problem. As discussed above, conventional dehumidifiers as well as water producing machines of the prior art are only designed to produce water in an air-conditioned environment. That is, such ambient conditions are generally 75–78° F., with relative humidity of about 45–55%. However, in outdoor settings, where substantially cooler ambient temperatures may be as low as 50° F., the evaporator surface temperature, which is operating at 20° F. below ambient (i.e. 30° F.), will generally freeze. Thus, the hot gas injection system is designed to increase the evaporator temperature by about 4 to 5° F., thereby preventing the condensate on the evaporator surface from freezing while still maintaining the evaporator temperature below its dew point in order to operate properly (i.e. remove water condensate from the ambient air entering the housing).

The hot gas injection system of the present invention comprises a hot gas bypass tube in communication with the refrigerant gas tube of the compressor and the refrigerant liquid tube extending from the condenser. The injection system further include a hot gas solenoid valve disposed within the bypass tube and a thermostat with a temperature sensor, the sensor positioned on the evaporator. The thermostat, which is in electrical communication with the hot gas solenoid, is programmed to a predetermined evaporator fin temperature, generally about 34° F., at which point it will trigger the solenoid valve to open, thereby releasing a limited metered amount of hot refrigerant gas from the compressor to the refrigerant liquid tube into the evaporator inlet via the bypass tube. The consequent mixture of the hot gas with the refrigerant liquid contained within the refrigerant liquid tube increases the temperature of the refrigerant liquid prior to entering the evaporator. This feature prevents condensate on the evaporator surface from freezing, thereby allowing continued operation of the machine by increasing the evaporator fin temperature. The thermostat may also be programmed to a second predetermined temperature that is lower than the first pre-determined temperature to deactivate the dehumidifier system of the machine when even colder, generally freezing, conditions of the ambient air entering the evaporator.

BRIEF DESCRIPTION OF THE FIGURES

FIG. 4 is a schematic representation of the continuous water filtration and dispensing feature of the preferred embodiment of the inventive machine.

FIG. 5A is a schematic representation of the hot gas injection system of the present invention.

FIG. 5B is an enlarged, sectional view of a portion of the hot gas injection system of the present invention.

FIG. 7A is a perspective view of the outer frame portion of the preferred embodiment of the present invention.

FIG. 7B is a perspective view of the outer housing of shown in FIG. 7A incorporating the outer panels.

DETAILED DESCRIPTION OF THE PREFERRED EMBODIMENTS

Referring now to the figures, the present invention is directed to an improved water producing and dispensing machine. Certain features of the present invention make the machine particularly beneficial in military applications where water may be scarce and cannot be provided by conventional water generators that only operate at room temperature conditions.

Figure 1:
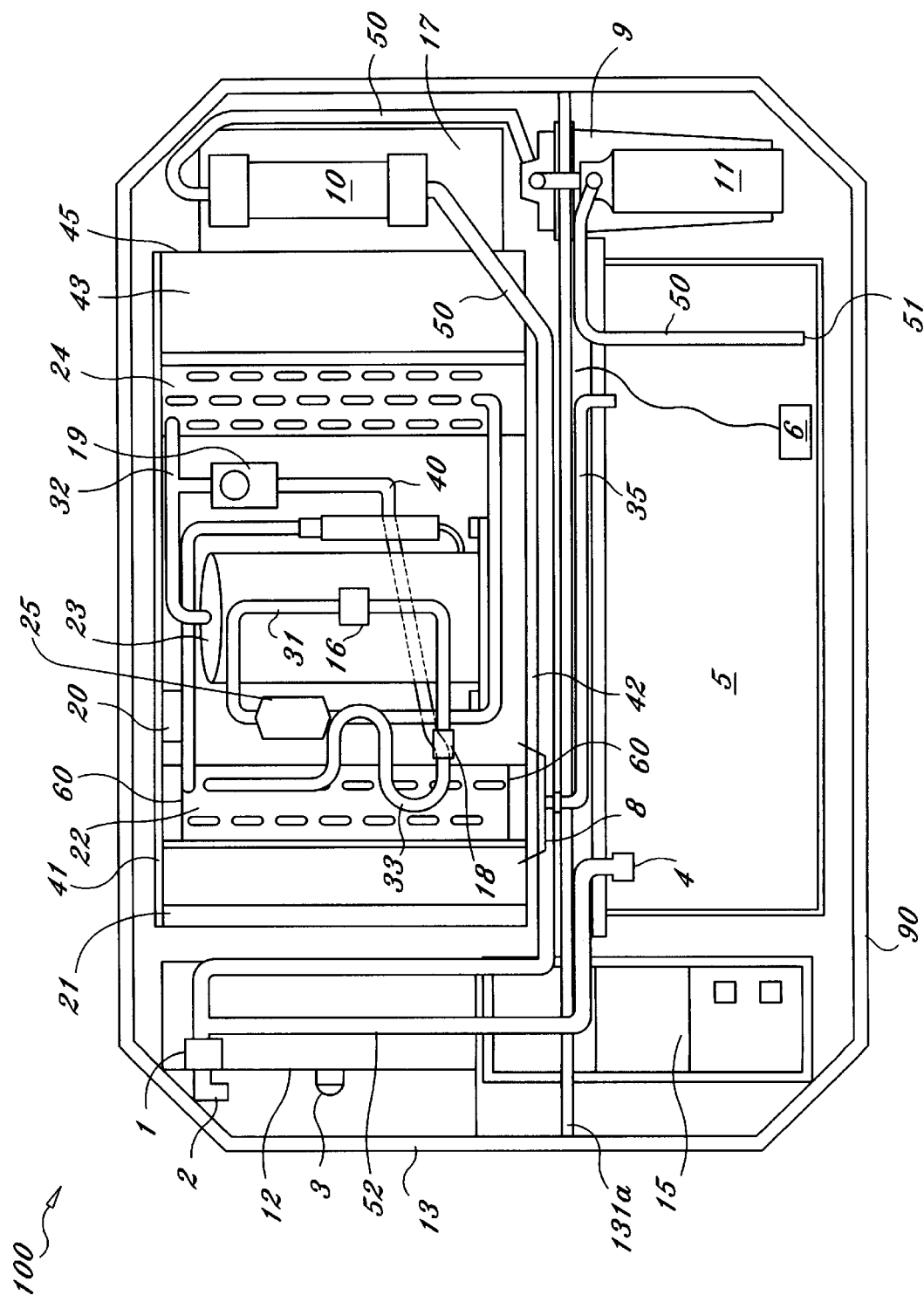
FIG. 1 is a partial sectional side view of the preferred embodiment of the inventive machine.

FIG. 1 is a partial side view of the inventive water producing and dispensing machine (100). The machine includes an outer housing unit (13) that contains the main interior components of the machine, namely the dehumidifier system, discussed further below; the water filtration and dispensing system, which includes the water containment tank (5) and is illustrated in more detail in FIG. 4; the electrical components housed in an electrical box (28) and inverter (15); and the hot gas injection system, shown more clearly in FIGS. 5A–5B.

For ease of explanation, Section I below will describe in greater detail the dehumidifier system of the present invention, Section II will describe the water containment, filtration, and dispensing features of the present invention, Section III will describe the hot gas injection system of the present invention, and Section IV will describe preferred housing unit design and other features not explicitly mentioned or described in the earlier sections of this disclosure.

I. The Dehumidifier System:

FIG. 1 illustrates a preferred dehumidifier system of the present invention, comprising an evaporator (22), a compressor (23) that pumps a refrigerant gas, a condenser (24), tubing (33) connecting the evaporator, compressor, and condenser through which the refrigerant gas/liquid travels therebetween.

Figure 3:
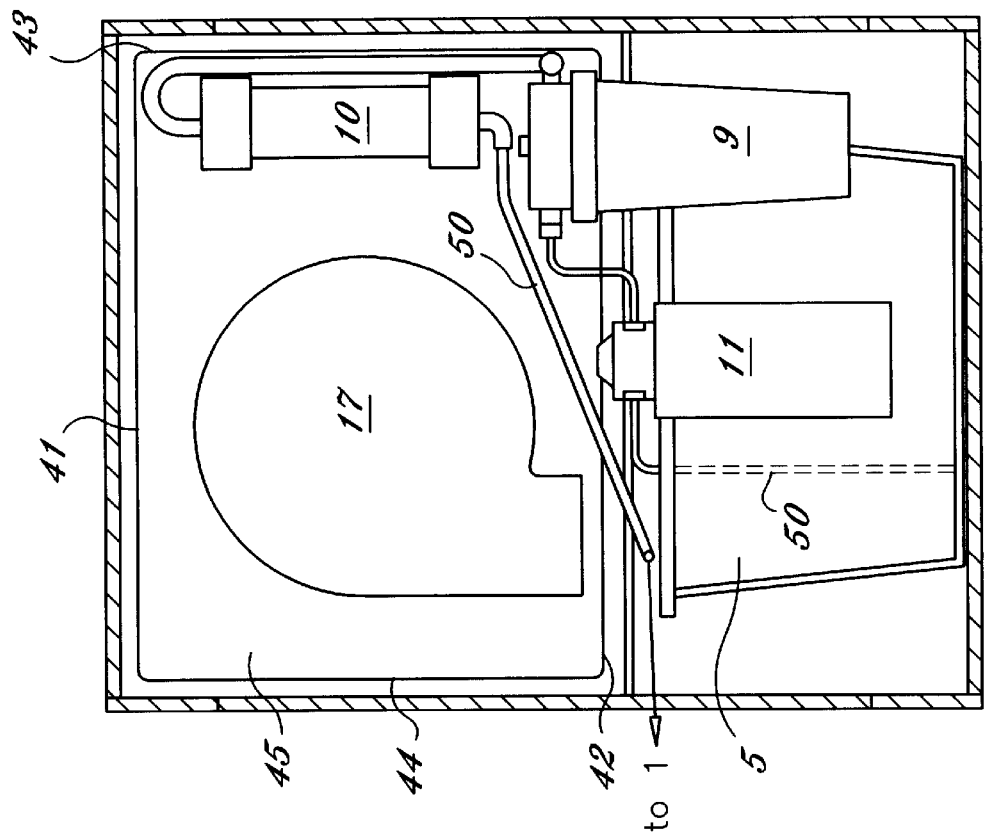
FIG. 3 is a rear view, partial cutaway of the preferred embodiment of the inventive machine showing some of the interior contents.
Figure 2:
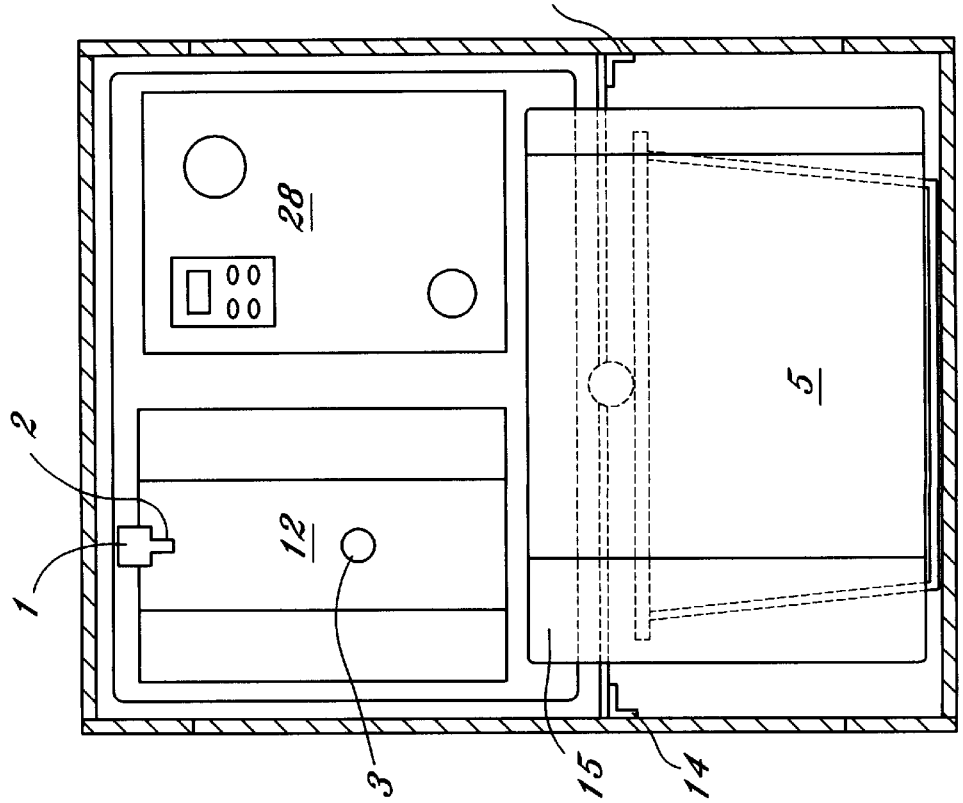
FIG. 2 is a front view, partial cutaway of the preferred embodiment of the inventive machine showing some of the interior contents.
Figure 6:
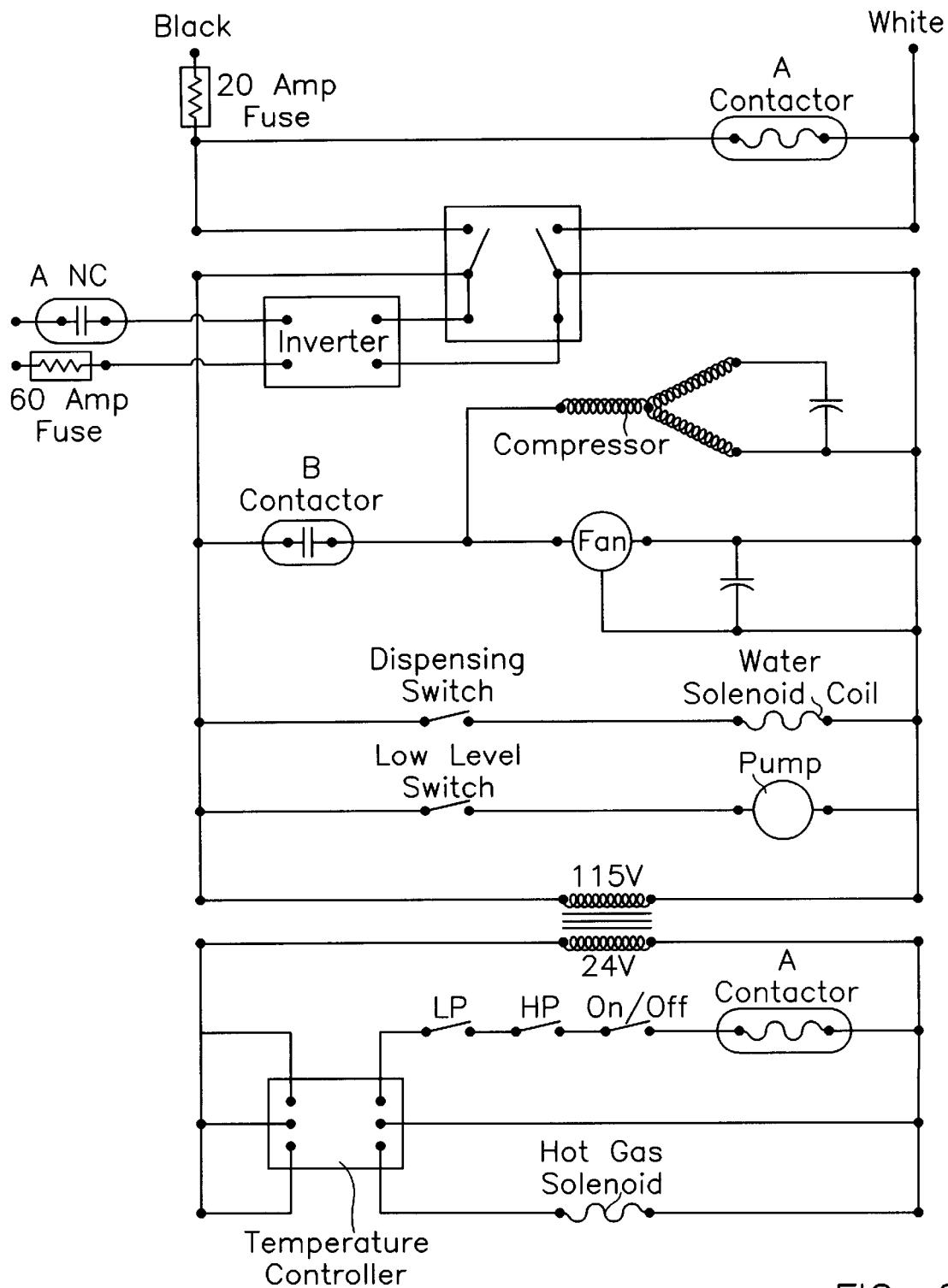
FIG. 6 is a schematic view of the electrical circuitry of the preferred embodiment of the present invention.

Preferably, the evaporator, compressor, and condenser are partially encased in a secondary housing compartment defined in part by a top panel (41), a lower panel (42), and two opposing side panels (43, 44) (see FIGS. 1 and 3) connecting the top and lower panels. Preferably, these panels are formed of a durable material, such as a metal or plastic, preferably a polycarbonate plastic. The four panels are joined at one end by an air filter (21), which is separated a distance from the evaporator (21) to form a plenum gap therebetween. The four panels are joined at the opposite end by an end panel (45) formed of the same material as the two upper (41) and lower (42) panels. An opening (not shown) is provided through the end panel (45) through which the air blower (17) is secured. The air blower (17) is also separated a distance from the condenser (24) to form a plenum gap therebetween.

For purposes of generating water from the ambient air, the dehumidifier system of present invention works similarly to conventional dehumidifiers. Upon activation of the air blower (17), ambient air is drawn into the housing, in the direction of the arrow A, through a series of air inlet vents (91) on the front of the housing unit (FIG. 7B). These air inlet vents may be series of slots (91) within the front panels of the housing unit or any other means disposed on the outer housing unit to allow air to enter (FIG. 7B). As the air enters the housing unit, it passes through the air filter (21) and into the secondary housing compartment containing the dehumidifier system components. Exemplary air filters (21) suitable for use in the present invention include, but are not limited to, HEPA filters and/or R/F ion filtration systems for removing airborne contaminants. The air blower (17) creates a negative pressure within the machine to pull the air out of the machine and discharge through the air outlet slots (92). The air outlets (92) may comprise any opening or series of openings or vents in the floor (90) of the housing unit (FIGS. 1 and (7B). Preferably, the air blower (17) is situated outside the secondary housing compartment, such that the air is forced out of the machine through the air outlets, thereby preventing the discharged air from reentering the machine.

The dehumidifier system operates similarly to conventional dehumidifiers in removing water from the ambient air as the air travels through the second housing compartment. In operation, the compressor (23) compresses refrigerant gas contained therein to form a very hot gas. The hot gas is then transferred to the condenser (24) via a tube (33). The condenser (24) is disposed such that as air travels through the condenser and out of the machine, hot air is drawn off the condenser (24), thereby cooling the condenser. The hot gas contained in the condenser, upon cooling, is then converted into a cool liquid. A thermoexpansion valve sensing bulb (20) is positioned rearward of the evaporator and operates in conjunction with the thermoexpansion valve (16) disposed within the refrigerant liquid tube (31) (see FIGS. 5A and 5B) to control the temperature of the evaporator (22), generally about 15 to about 20° F. below ambient temperature (i.e. thus below the dew point). The cool refrigerant liquid flows through the filter dryer (25) and to the evaporator (22) via a tube (31) that is in communication with an expansion valve (16). The evaporator (22), which may be a conventional fin and tube, is structured to receive and cycle the cold refrigerant liquid therethrough. As ambient air passes through the air filter (21) and comes in contact with the exterior surface of the evaporator, water in the air condenses onto the evaporator (22) surface in the form of water droplets. Preferably, there is about a 1-inch gap (60) between the evaporator (22) and the upper and lower panels (41, 42) of the secondary housing compartment, since the evaporator (22) requires less air flow than the condenser (24). The water droplets, via gravity, fall into a collection tray (8) disposed directly beneath the evaporator (22). The water then travels from the tray (8) into a water containment tank (5) via a tube (35) in communication with the tray (8) and tank (5).

Preferably, the evaporator (22) is formed of a metal that will become substantially cold as the refrigerant liquid flows through the evaporator (22). Common types of metal used in fabricating conventional evaporators include copper; however, there is a very serious risk of copper ion contamination of the water as it forms on the evaporator and is subsequently collected into the water containment tank (5). Thus, in preferred embodiments, the evaporator coil is coated with an FDA approved coating (21 CFR §175.300) to resist heavy metal copper ion absorption into the water condensate formed on the evaporator surface, but allowing good heat transfer. An exemplary coating is an FDA-approved baked polyester enamel; however, any FDA-approved coating generally used in the heat exchange manufacturing industry for this purpose may be employed.

The dehumidifier system described above and illustrated in the figures is the preferred type for the present invention, especially when combined with the water producing and dispensing system employing the novel hot gas injection system of the present invention. However, it will be readily appreciated by those of ordinary skill in the art that variations of the dehumidifier system as well as other types of dehumidifiers, either now known or later developed, may be employed in the present inventive water producing and dispensing machine without departing from the spirit and scope of the present invention.

II. Hot Gas Injection System:

The water producing and dispensing machine of the present invention may also include a novel hot gas injection system, as shown more clearly in FIGS. 1, 5A, and 5B. The purpose of the hot gas injection system is to allow for the removal of water from ambient air via the dehumidifier system at temperatures significantly lower than room temperature. Without this feature, the condensate forming on the evaporator (22) surface would freeze thereon at ambient temperatures of about 50° F., where the evaporator fin temperature would be about 30° F. Thus, where it my be necessary to generate potable water under such conditions, the inventive hot gas injection system is extremely beneficial.

As illustrated in FIGS. 5A–5B, the hot gas injection system of the present invention is disposed within the main housing unit (13) and comprises a hot gas bypass tube (40) which is in communication with the refrigerant gas tube (32) extending from the compressor (23). A solenoid valve (19) is disposed within the hot gas bypass tube (40). When the valve (19) is opened, hot gas from the compressor (23) is diverted from the main refrigerant gas tube (32) to the bypass tube (40) [Arrow B indicates direction of hot gas flow]. The bypass tube (40) is in further communication with the refrigerant liquid tube (31) leading to the evaporator (22). As the hot gas enters the refrigerant liquid tube (31), it mixes with the refrigerant liquid contained therein. The "warmer" refrigerant liquid then increases the surface temperature of the evaporator (22) slightly (i.e. about 4° F. to 5° F.) without exceeding the ambient dew point. Thus, for example, where the evaporator temperature is typically at about 34° F. at ambient temperatures of about 50° F., the "warmed" refrigerant liquid entering the evaporator (22) will increase the evaporator temperature to about 38° F. or 39° F. (i.e. above freezing) and still allow the machine to produce condensate down to such ambient temperatures.

FIG. 5B is an enlarged, partial section view of the junction (18) between the hot gas bypass tube (40) and the refrigerant liquid tube (31). Preferably, the end of the bypass tube (40) in communication with the refrigerant liquid tube (31) is a 2-inch long, #4 capillary tube (40a) positioned in the center of the tube (31), through which the hot gas is injected in the direction of flow. Preferably, the refrigerant liquid tube (31) has a portion (C) with a wider diameter (e.g. ⅜ inch) on the evaporator side of the bypass tube/liquid tube junction (61) (i.e. where the gas is injected from the capillary tube (40a)) than that portion (D) (e.g. 5/16 inch) of the tube on the other side of the junction (60). The combination of the structure of the capillary tube (i.e. length and diameter), relative diameters of the refrigerant liquid tube (31) just described, and the positioning of the capillary tube (40a) within the center of the refrigerant liquid tube (31) is a particularly advantageous feature of the hot gas injection system of the present invention in that it allows for even dispersement of the gas within the refrigerant liquid tube (31), resulting in a uniform temperature increase.

The operation of the solenoid valve (19) of the hot gas injection system is controlled by a thermostat contained in the electrical box (28) which may be programmed to a pre-determined temperature, preferably about 34° F. The thermostat comprises a temperature sensor (26) positioned on the evaporator fins (22) (FIG. 5A). When the sensor (26) detects the pre-determined temperature setting, an electrical relay point on the thermostat will trigger the solenoid valve (19) to open, thereby releasing hot refrigerant gas from the compressor (23) to the refrigerant liquid tube (31) via the bypass tube (40). The solenoid valve (19) will remain open until the evaporator fin temperature reaches about 39° F. The thermostat may also be programmed with a second pre-determined temperature, preferably a temperature just below 34° F. (i.e. about 32° F.) or the first pre-determined temperature, depending upon the humidity, which will operate to shut down the dehumidifier system entirely when the sensor (26) detects the second pre-determined temperature. The dehumidifier system will not switch back on until the evaporator fin (22) temperature increases to about 36° F. to 37° F. The water filtration and dispensing system, discussed in greater detail in Section III below, may still continue to operate when the dehumidifier system is not operating to produce water.

III. Water Filtration and Dispensing System:

One problem encountered by prior art potable water generators is that the water collected may become stagnate prior to dispensing if there are relatively long periods of non-use. Certain embodiments of the present invention incorporate a novel feature of continuous filtration to avoid this problem entirely.

Referring now to FIGS. 1–4, the present invention may employ a novel water dispensing and filtration system disposed within the primary housing unit (13). Specifically, the water dispensing and filtration system includes a water delivery tube (50) with one end (51) submerged within the water stored in the water containment tank (5). The opposite end of the water delivery tube (50) is connected to a spigot (2). The water delivery tube is connected to a pump (11) which draws the water from the tank (5) through the water delivery tube (50). The water pump (11) stops when a low water sensor (6), positioned within the tank (5) and in electrical communication with the pump (11), detects a minimum water level within the tank (5) (this feature prevents from pump from running dry, and thus being damaged). The water delivery tube (50) also preferably passes through at least one, and more preferably, two filters prior to dispensing: a carbon filter (9) for removing distasteful or harmful chemical impurities and a membrane filter (10), such as a hydrophilic polymer membrane, for removing most harmful pathogens.

The water delivery tube (50) is also connected to, and thus in fluid communication with, a water return tube (52). The water return tube (52) has one end positioned within the water containment tank (5). When the pump (11) is activated, the water is drawn from the water containment tank, through the filters (9,10) to remove various impurities and pathogens, through the water return tube (52), and back into the tank (5) to be stored and recycled. While the pump (11) is in operation, the movement of water through the water delivery tube (50)/water return tube (52)/tank (5) is constant for continuous filtration prior to dispensing. To dispense potable water from the machine, a dispensing switch is (3) activated, the dispensing switch (3) being electrically connected to a solenoid valve (1) disposed between the dispensing spigot (2) and the water delivery tube (50). Upon activation of the switch (3), the solenoid valve (1) is opened, and the water is diverted from the return tube (52) to the spigot (2) for dispensing. The diversion of water occurs because the return tube (52) has a restrictor (4) at the end of the tube that is disposed within the tank (5), the restrictor (4) having a narrower diameter than the rest of the return tube (52) and, more importantly, a narrower diameter than the water delivery tube (50). Thus, when the valve (1) is opened, the positive pressure created by the restrictor (4) diverts the water to the spigot (2). When the dispensing switch (3) is deactivated, the valve (1) closes, thereby causing the water to travel from the water delivery tube (50) to the return tube (52), albeit more slowly than during the dispensing mode due to the narrowed diameter of the restrictor (4).

The present invention may also incorporate an overflow pipe (7) within the water containment tank (5) to prevent water from overflowing into the machine itself, thereby causing damage (FIG. 4). Alternatively, a high level sensor/switch (not shown) could be employed to shut down operation of the dehumidifier, and therefore water production, until the water level falls below a certain maximum level within the tank (5) through usage.

IV. Housing Unit:

The water producing and dispensing machine of the present invention preferably incorporates a durable primary housing unit encasing the interior contents, including the dehumidifier system, the water filtration and dispensing system, the electrical power components (28), and the water containment tank (5). Preferably, the housing comprises a durable exoskeletal frame, as shown more clearly in FIG. 7A, formed of steel (preferably one-inch steel tubing). The exoskeletal frame (130) comprises a pair of opposing side frames (130a). Each side frame (130a) comprises an upper end (13a), a lower end (13b), a front end (13c), and a rear end (13d) all connected to, and more preferably integral with, one another as shown. The side frames (130a) are connected to one another by at least one support bar (131) preferably integral with, and extending between, the upper (13a) and lower (13b) ends of each side frame (130a). Each side frame (130a) further includes a cross bar (131a) disposed between and parallel to the upper (13a) and lower (13b) ends of the side frame (130a) and preferably integral with and perpendicular to the front (13c) and rear (13d) ends of the side frame (130a). Each cross bar (131a) further includes a series of brackets (14) for securing and supporting the secondary housing compartment containing the dehumidifier system, namely the lower panel (42) and side panels (43, 44) of the secondary housing compartment (see FIGS. 1 and 3). Preferably, each bracket (14) includes a shock absorbing mount (14a) secured thereto to help stabilize the secondary housing compartment during transportation of the machine, for example, thereby minimizing any vibrational damage that might occur. Alternatively, the shock absorbing mounts (14a) may be secured to the bottom panel (42) of the secondary housing compartment (not shown) in alignment with the brackets (14). The shock absorbing mounts (14a) may be rubber buttons or any type of shock absorber known by those of ordinary skill in the art that can be readily secured to either the brackets (14) or the secondary housing compartment.

In addition to the exoskeletal frame described above, the primary housing unit includes a series of outer flat panels (140) secured to the side frames as shown in FIG. 7B. Preferably, the panels (140) are releasably secured to the side frames by a spring loaded, quick release fasteners, commonly known in the art as Zeus fasteners (141), for easy removal of the panels (140) therefrom to access the inner contents of the housing unit. Such fasteners (141) are commonly used on military equipment.

The primary housing unit of the present invention, as discussed above, is particularly desirable in military applications where the equipment must be durable and therefore not easily damaged during transportation over rugged terrain. Such equipment must also be sufficiently durable to withstand frequent loading/unloading from vehicles. Moreover, it is often necessary to air drop equipment to remote locations via airplanes or helicopters. The durable exoskeletal frame described above allows this type of extreme handling by preventing damage to the contents therein. Damage is further minimized by encasing the dehumidifier system in the secondary housing compartment, as described previously, and then further securing the secondary housing compartment to the exoskeletal frame on brackets (14) containing shock absorbing mounts (14a). The primary housing unit may also employ hand grips (300) for ease of handling by personnel.

Finally, the present invention may employ an electrical system (28) that allows it to run off the power of a truck or boat. This feature, again, is particularly beneficial in military applications, where it may be desirable to produce water during transportation without requiring a separate power source, such as batteries, that will quickly lose power during long periods of continuous operation. Since most military vehicles operate on a 24V direct current battery, the present invention incorporates an inverter (shown schematically as "15") that functions to convert the 24V direct current from the vehicle to 115V alternating current to operate the machine. In addition, the machine may also be connected directly to a 115V AC generator or a permanently installed electrical supply source.

I claim:

1. A water producing and dispensing machine comprising:
   (a) a housing unit having an air outlet and an air inlet;
   (b) a dehumidifier system disposed within said housing unit, said dehumidifier system comprising an evaporator, a compressor for pumping a refrigerant gas, a condenser, a refrigerant gas tube in communication with said compressor and said condenser and through which said refrigerant gas is pumped from said compressor to said condenser, a refrigerant liquid tube in communication with, and disposed between, said condenser and said evaporator and through which refrigerant liquid is carried from said condenser to said evaporator to cool said evaporator, and an air blower, wherein said dehumidifier system is designed to remove water from ambient air drawn into said housing unit through said air inlet by said air blower as said ambient air moves over said evaporator and condenses thereon as water droplets;
   (c) a hot refrigerant gas injection system disposed within said housing unit, said injection system comprising a hot gas bypass tube in communication with said refrigerant gas tube of said condenser and said refrigerant liquid tube extending from said condenser, said injection system further including a solenoid valve disposed within said bypass tube, wherein when said valve is opened, hot refrigerant gas travels through said bypass tube from said compressor and into said refrigerant liquid tube, thereby mixing with said refrigerant liquid contained therein to increase the temperature of said refrigerant liquid prior to entering said evaporator;
   (d) a thermostat disposed within said housing unit and comprising a sensor positioned on said evaporator, said thermostat further programmed to activate said hot refrigerant gas injection system when the temperature of said evaporator reaches a first predetermined temperature below ambient temperature; thereby preventing said water droplets from freezing upon said evaporator;
   (e) a water containment tank in communication with said evaporator, said tank disposed within said housing unit and structured for receiving said water droplets from said evaporator; and
   (f) a water dispensing and filtration system disposed within said housing unit and in communication with said water containment tank.

2. The water producing and dispensing machine of claim 1, wherein said thermostat is further programmed to deactivate said machine when said sensor detects a second predetermined temperature on said evaporator, wherein said second predetermined temperature is lower than said first predetermined temperature.

3. The water producing and dispensing machine of claim 1, wherein said water dispensing and filtration system comprises:
   (a) a water delivery tube having one end positioned within said water containment tank to remove water from said water containment tank and a second end in communication with a spigot,
   (b) a water pump connected to said water delivery tube,
   (c) at least one water filter in communication with said water delivery tube, and
   (d) a water return tube having one end positioned within said water containment tank and a second end in communication with said water delivery tube; whereby when said water pump is activated and said spigot is closed, water is drawn from said water containment tank through said water delivery tube, through said at least one water filter, and through said return tube back into said water containment tank.

4. The water producing and dispensing machine of claim 3, wherein said water dispensing and filtration system further includes a dispensing switch for opening and closing said spigot via a valve connected to said spigot, wherein when said dispensing switch is activated to open said valve, water carried through said water delivery tube is diverted from said water return tube and dispensed through said spigot; and wherein when said dispensing switch is activated to close said valve, water continues to flow from said water delivery tube through said return tube and into said water containment tank.

5. The water producing and dispensing machine of claim 4, wherein said water return tube has a narrow diameter near said one end positioned within said water containment tank, thereby further causing water to be diverted from said return tube to and through said spigot upon activation of said dispensing switch to open said valve.

6. A water producing and dispensing machine comprising:
   (a) a housing unit having an air outlet and an air inlet;
   (b) a dehumidifier system disposed within said housing unit, said dehumidifier system comprising an evaporator, a compressor for pumping a refrigerant gas, a condenser, a refrigerant gas tube in communication with said compressor and said condenser and through which said refrigerant gas is pumped from said compressor to said condenser, a refrigerant liquid tube in communication with, and disposed between, said condenser and said evaporator and through which refrigerant liquid is carried from said condenser to said evaporator to cool said evaporator, and an air blower, wherein said dehumidifier system is designed to remove water from ambient air drawn into said housing unit through said air inlet by said air blower as said ambient air moves over said evaporator and condenses thereon as water droplets;
   (c) a hot refrigerant gas injection system disposed within said housing unit, said injection system comprising a hot gas bypass tube in communication with said refrigerant gas tube of said condenser and said refrigerant liquid tube extending from said condenser, said injection system further including a solenoid valve disposed within said bypass tube, wherein when said valve is opened, hot refrigerant gas travels through said bypass tube from said compressor and into said refrigerant liquid tube, thereby mixing with said refrigerant liquid contained therein to increase the temperature of said refrigerant liquid prior to entering said evaporator;

(d) a thermostat disposed within said housing unit and comprising a sensor positioned on said evaporator, said thermostat programmed to activate said hot refrigerant gas injection system when the temperature of said evaporator reaches a first predetermined temperature below ambient temperature; thereby preventing said water droplets from freezing upon said evaporator;

(e) said thermostat further programmed to deactivate said machine when said sensor detects a second predetermined temperature on said evaporator, wherein said second predetermined temperature is lower than said first predetermined temperature;

(f) a water containment tank in communication with said evaporator, said tank disposed within said housing unit and structured for receiving said water droplets from said evaporator; and (g) a water dispensing and filtration system disposed within said housing unit and in communication with said water containment tank, said water dispensing and filtration system further including:
  (i) a water delivery tube having one end positioned within said water containment tank to remove water from said water containment tank and a second end in communication with a spigot,
  (ii) a water pump connected to said water delivery tube,
  (iii) at least one water filter in communication with said water delivery tube, and
  (iv) a water return tube having one end positioned within said water containment tank and a second end in communication with said water delivery tube; whereby when said water pump is activated and said spigot is closed, water is drawn from said water containment tank through said water delivery tube, through said at least one water filter, and through said return tube back into said water containment tank.

7. The water dispensing and filtration system of claim 6, wherein said water dispensing and filtration system further includes a dispensing switch for opening and closing said spigot via a valve connected to said spigot, wherein when said dispensing switch is activated to open said valve, water carried through said water delivery tube is diverted from said water return tube and dispensed through said spigot; and wherein when said dispensing switch is activated to close said valve, water continues to flow from said water delivery tube through said return tube and into said water containment tank.

8. The water dispensing and filtration system of claim 7, said housing unit further comprising a pair of parallel opposing side frames formed of durable metal, each having an upper end and a lower end connected to one another by at least one support bar, each of said side frames further having a front end and a rear end perpendicularly connected to said upper and lower ends of said each of said side frames, and wherein each of said side frames has a cross bar perpendicularly connected to said front and lower ends, each of said cross bars of said pair of side frames positioned in parallel and configured to support a secondary housing compartment containing said dehumidifier system.

* * * * *